M. J. FRAMBACH.
ANTISKIDDING DEVICE FOR AUTOMOBILES.
APPLICATION FILED MAY 26, 1916.

1,269,921.

Patented June 18, 1918.

Inventor
M. J. Frambach.
By
Attorney

UNITED STATES PATENT OFFICE.

MATHEW J. FRAMBACH, OF MELVIN, IOWA, ASSIGNOR OF ONE-HALF TO GEORGE A. ROMEY, OF MELVIN, IOWA.

ANTISKIDDING DEVICE FOR AUTOMOBILES.

1,269,921.          Specification of Letters Patent.      Patented June 18, 1918.

Application filed May 26, 1916. Serial No. 100,100.

*To all whom it may concern:*

Be it known that I, MATHEW J. FRAMBACH, a citizen of the United States, residing at Melvin, in the county of Osceola and State of Iowa, have invented certain new and useful Improvements in Antiskidding Devices for Automobiles, of which the following is a specification.

My invention relates to new and useful improvements in anti-slipping or anti-skidding devices and more particularly to non-slipping tire chains, the primary object of my invention being the provision of a tire chain applicable to wheels having pneumatic or cushioned tires and of the type adapted to encircle the tread portion of the tire and when hooked in place to be held upon the wheel by the inflated tire itself.

Broadly speaking, my improved tire chain comprises circumferential chain sections adapted to engage against opposite sides of the tire adjacent the rim and connected at spaced intervals by transverse chain sections which extend across the tread of the tire, the chain as a whole being in the form of a band applicable about the periphery of the tire and the side chains being provided with hook fastening devices by means of which adjacent ends of the chain may be connected when it is in place.

In this connection, one object of my invention is the provision of a novel form of hook for connecting the ends of the side chains of the device.

The primary object of my invention, however, is the provision of novel attaching or hook links by means of which the cross chains are connected to the side chains in such a manner that when the vehicle is in motion, the binding of an intermediate portion of a cross chain between the ground and the tire will result in tilting the connecting or hook links by which such chain is secured to the side chains of the device in such a manner as to create kinks in the side chains shortening the effective lengths of the side chains in such a manner that the entire antiskidding chain is firmly bound against the tire and the wheel cannot have any turning movement independent of the chain.

Tire chains now in use are supposed to be applied to a tire when the latter is partially deflated, being drawn tightly about the tire at that time, with the result that when the tire is fully inflated, the links are partially embedded therein and the chain held against any appreciable movement about the tire. It is, however, obvious that drivers of motor vehicles, particularly pleasure vehicles, will not go to the trouble of partially deflating their tires when they are applying non-skid chains thereto because of the labor involved in again inflating them. The result is that no matter how tightly the driver attempts to draw the chains about the tires, they do in effect but loosely encircle the tires and are free to creep about them. In snow or in soft mud, the chains are, therefore, rendered useless as the wheels will revolve freely within the chains. For this reason, most drivers, when applying the chains now commonly used, fasten the chains directly to the wheel by passing a strap or other device about one of the wheel spokes. This custom, however, is objectionable as time is consumed in securing these added fastening devices and for the further reason that the fastening devices may readily become broken or otherwise injured so as to leave the chain loose. Furthermore, the slack of the chain, even when drawn as tightly as possible in applying it about a fully inflated tire, is such that in many instances the chains continually strike against the mud guards of the vehicle.

By constructing my tire chain in such a manner that it is automatically locked against creeping movement upon a tire, I am able to overcome the above noted disadvantages.

Another object which I have in mind is the construction of the connecting or hook links in such a manner that their use will materially decrease the number of links necessary in the cross chains of the anti-skidding device, with the result that the cost of manufacture is materially reduced.

With these and other objects in view, my invention will be more fully described, illustrated in the accompanying drawings, and then particularly pointed out in the claim which is attached to and forms a part of this specification.

In the drawings:

Fig. 6 is a fragmentary perspective view, showing the manner in which the locking hook is employed.

Corresponding and like parts are referred to in the following description and indicated in all the views of the drawings by the same reference characters.

My improved tire chain primarily consists of side chains 10, transverse chains 11 connected at their ends to the side chains by connecting links 12 substantially V-shaped and locking hooks 13 connected to the side chains at one end of the device and adapted to engage the other ends of the corresponding side chains when the anti-skidding device is applied to a tire.

Figure 2:
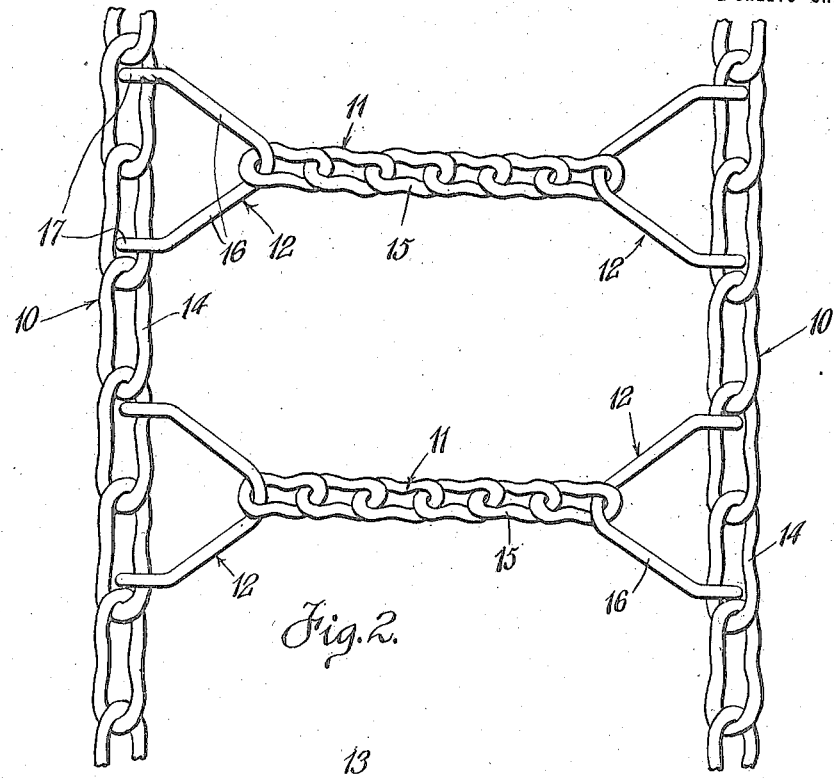
Fig. 2 is a fragmentary plan view of one of my tire chains.

More specifically, each of the side chains 10 is made up of a plurality of chain links 14 which are of equal length and preferably substantially elliptical in shape, having their end portions bent to lie in planes practically at right angles to each other in order that the chains as a whole may rest as snugly as possible against the sides of a tire and adjacent the rim of the wheel carrying the tire. The cross chains 11 are formed of links 15 generally of the same style as the links 14 of the side chains, but preferably somewhat smaller, as clearly shown in Fig. 2. The ends of the cross chains are connected to opposite portions of the side chains by the hook or connecting links 12. Each of these connecting links 12 comprises a substantially V-shaped body member bent from a relatively stiff resilient rod or wire to form the diverging arms 16, the ends of which are rebent upon themselves to form eyes 17 in planes at right angles to the plane of the body of the link 12, these eye forming terminals being bent inwardly to lie parallel to each other, as clearly shown in Fig. 2. The eyes 17 engage around the side portion of a coupled pair of the links of the side chains and bear against the adjacent ends of the links which intervene between the links which are engaged by the eyes of the V-shaped connecting elements.

By this means the V-shaped connecting elements are prevented from displacement longitudinally of the side chains under the severe racking strains to which they are subjected, while at the same time the links with which the connecting elements are united are free to be displaced to cause the cross chains to frictionally grip the tire at an angle relative to their normal position.

The hook links 12 may be made in different sizes and proportions so that their eyes 17 will be spaced at any desired distance, provided that the eyes of each hook link 12 will encircle the side portions of two interengaging links of a side chain adjacent the ends of such links remote from the interengaging ends thereof in order that any swinging of the intermediate portion of the hook link 12, in a direction substantially parallel to the side chain 10 to which it is connected, will cause the links 14 of such side chain, which are engaged by the hook link 12, to act as a single link and be swung at an angle or out of alinement with the remainder of the side chain. Because of this, when the anti-skidding chain is positioned about a tire, any swinging of a hook link, by forcing certain of the links of the side chain out of alinement with the remaining links, will cause in effect a shortening of the side chain and a consequent tightening of the anti-skidding chain as a whole about the tire to which it is applied.

Each tire chain is, of course, proportioned for use upon a tire of a certain size, different sizes of chains being provided for different sizes of tires and the dimensions of the chains not only varying as regards the length of the side chains, but also as regards the length of the cross chains.

Figure 1:
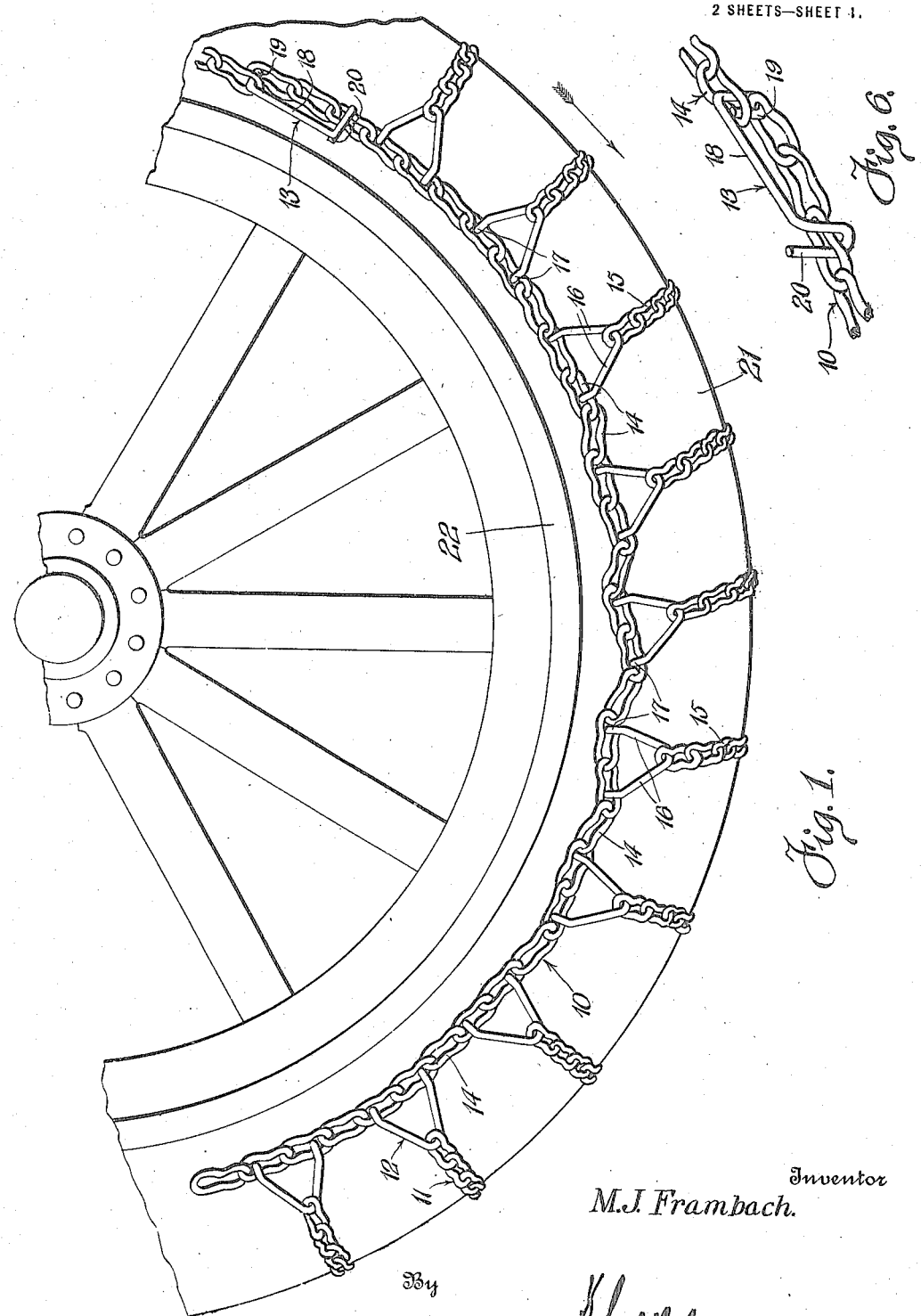
Figure 1 is a fragmentary elevational view of a conventional form of wheel having a pneumatic tire to which one of my improved tire chains is applied, the distortion or kinking of the side chains of the anti-skidding device, due to engagement of the cross chains with the ground, when the wheel is in motion, being clearly shown in this figure.
Figure 5:
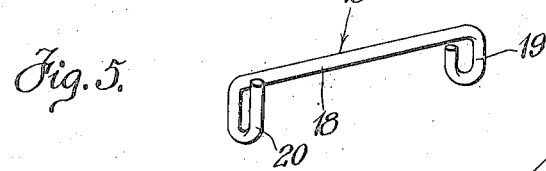
Fig. 5 is a perspective view of one of the locking hooks employed in connecting adjacent ends of the side chains.

Each side chain is provided at one end with one of the locking hooks 13, as shown in Figs. 1, 5 and 6 of the drawings, these locking hooks being preferably both attached to one end of the anti-skidding chain as a whole to facilitate the application and removal of the chain. As best shown in Fig. 5, each of these locking hooks includes a straight body portion or shank 18 having one end rebent to form an eye 19 and its opposite end bent at right angles to the shank and then rebent upwardly to provide a hook 20 disposed in a plane at right angles to the plane of the eye 19 and body portion or shank. As a result, the branches of the hook proper are parallel and the bill is offset with respect to the body portion or shank of the locking member and its eye.

My improved tire chains are applied in the usual manner, the wheels to which they are applied either being jacked up, in order that the chains may be positioned about the tires, or the chains being laid upon the ground either in front or at the rear of the wheels and the vehicle moved to bring the wheels onto the chain. The tires, however, are not deflated during the application of the chains. When a chain has been positioned about a tire, in the manner shown in Fig. 1, with its ends in juxtaposition to each other, the locking member carried by one end of a side chain is passed completely through a link adjacent the other end of the same side chain and then swung backwardly about its eye as a pivot or fulcrum so that it will extend substantially parallel to that portion of the chain to which its eye is connected, its hook portion straddling a side of one of the links of the side chain with its bill in position to enter said link after which the extremity of the bill is engaged in said link in the manner shown in Figs. 1 and 6. Obviously, the locking member should be passed through a link as remote as possible from the end of the chain in order that the swinging of the hook to the position shown in the drawings may cause a taking up or tightening of the side chain. It is to be noted, particularly on reference to Fig. 6, that the eye 19 of the locking member lies in substantially the same plane as the shank thereof and will enter the link through which the locking member is passed. Consequently, strain exerted upon the member, when it is in use, is applied in a direction tending to close the eye and not open it, so that there is no danger of the eye becoming disengaged from the link to which it is connected. It is also to be noted that this strain, acting upon the eye within the bight defined by the eye, the chain link to which it is attached and the shank of the locking member, tends at all times to swing the shank in a direction to keep the bill 20 in firm engagement with that link through which the same may be passed.

With chains constructed in accordance with this invention and locking hooks of the type shown, it is possible to furnish the chains to a wholesale dealer in relatively long lengths and to provide the hooks separate, suitable lengths being cut from the main chain to encircle the wheel for which they are intended and the hooks being then connected to it by merely clenching their eyes through links of the side chains.

In practice, one of my improved anti-skidding chains may be applied to a tire 21 mounted upon a wheel rim 22, as shown in Fig. 1 of the drawings. When so applied, the chain will be as tightly engaged about the tire as any of the anti-skid chains now in use unless such chains are under size and have been applied while the tire was partially deflated and unless the tire has then again been fully inflated. In considering the operation of my improved anti-skidding chain, I will assume that the wheel shown in Fig. 1 is turning in the direction of the arrow, that is, that the vehicle is traveling toward the right. Under these circumstances, each and every cross chain engaging the ground is clamped between the ground and tire 21 and the turning of the wheel causes such cross chains to drag, with the result that their connecting or hook links 12 are tilted to swing certain links of the side chains out of line and create kinks in the side chains, causing them to bind more tightly about the tire and to bring the cross chains all into close binding engagement with the tire. The result is that all peripheral slipping or creeping of the chain with respect to the tire is practically eliminated and no matter how soft the mud or snow in which the vehicle is traveling, it will be impossible for the wheels to spin inside the chains. By varying the size and proportions of the links of the side chains and of the connecting or hook links 12, it is possible to construct an anti-skidding chain in which the side chains proper will be distorted to almost any desired extent when the vehicle is in motion, and in which the anti-skidding chain will, therefore, be bound to the tire with any desired force.

For these reasons I do not limit myself to the specific details of construction or arrangement of parts shown, as various changes may be made therein within the scope of the appended claim.

Figure 3:
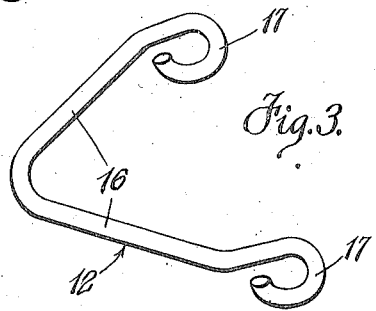
Fig. 3 is a perspective view of one of the connecting or hook links by which the cross chains are secured to the side chains of the device.
Figure 4:
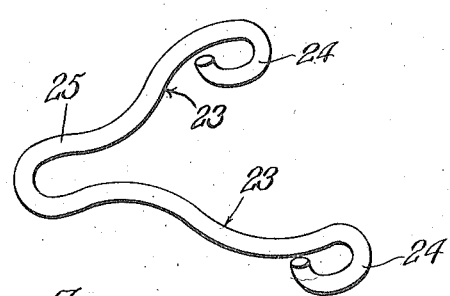
Fig. 4 is a similar view, showing a modified form of hook link.

In place of the attaching or hook link shown in Fig. 3 I may employ one of the type shown in Fig. 4 and indicated by the numeral 23 which is also substantially triangular in shape with its ends bent to form eyes 24, corresponding to the eyes 17 and similarly disposed. The sides of this link, adjacent its vertex, are inbent toward each other so that they present substantially parallel portions 25 between which the end of the cross chain may be effectually held.

With a tire chain there is a certain amount of differential motion between the chain and wheel, due to their difference in size and the looser the chain the greater the amount of this movement. My chain, because of its gripping action upon the tire, therefore, to a great extent, if not entirely, overcomes this objection.

Having thus described the invention, what is claimed as new is:

A non-skid device comprising side chains formed of longitudinally movable links, a plurality of substantially V-shaped connecting elements including terminal eyes engaging coupled pairs of said links, and cross chains connected to each opposite pair of the connecting elements, said terminal eyes bearing against the adjacent ends of the links which intervene between the links which are engaged by the connecting elements and operating to prevent the displacement of the connecting elements longitudinally of the side chains but leaving the links which are engaged by the connecting elements free to be displaced radially of the wheel to shorten the effective length of the side chains to cause the cross chains to frictionally grip the tire at an angle relatively to their normal position.

In testimony whereof I affix my signature.

MATHEW J. FRAMBACH. [L. S.]